US009970698B2

(12) United States Patent
Gomes et al.

(10) Patent No.: US 9,970,698 B2
(45) Date of Patent: *May 15, 2018

(54) MULTIPLE EVAPORATOR CONTROL USING PWM VALVE/COMPRESSOR (71) Applicant: WHIRLPOOL CORPORATION, Benton Harbor, MI (US)

(72) Inventors: Alberto Regio Gomes, St. Joseph, MI (US); Raffaele Paganini, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/176,295

(22) Filed: Jun. 8, 2016

(65) Prior Publication Data
US 2016/0282032 A1 Sep. 29, 2016

Related U.S. Application Data (63) Continuation-in-part of application No. 13/279,421, filed on Oct. 24, 2011, now Pat. No. 9,103,569, and
(Continued)

(51) Int. Cl.
F25D 11/02 (2006.01)
F16K 11/074 (2006.01)
(Continued)

(52) U.S. Cl.
CPC ........ F25D 11/022 (2013.01); F16K 11/0746 (2013.01); F16K 31/0603 (2013.01);
(Continued)

(58) Field of Classification Search
CPC .... F25D 11/022; F25D 11/006; F25D 23/065; F25D 2500/02; F25B 5/02; F25B 41/04;
(Continued)

(56) References Cited

U.S. PATENT DOCUMENTS 2,123,497 A 7/1938 Buchanan
3,677,028 A 7/1972 Raymond
(Continued)

FOREIGN PATENT DOCUMENTS

EP 1167898 A1 1/2002
JP 2001317069 A2 11/2004

OTHER PUBLICATIONS

European Patent Applicatio No. 14155437.8, filed Sep. 17, 2014, Applicant: Whirlpool; European extended search report re: same, dated Apr. 16, 2015.
(Continued)

Primary Examiner — Mohammad M Ali (57) ABSTRACT

A refrigeration system including a condenser; a (single) linear compressor that is activated and deactivated by a pulse width modulation switching device; a pulse width modulation refrigerant flow switch; at least two evaporators operably connected in parallel with one another with at least one evaporator associated with the refrigerator compartment that operates at a first refrigerant fluid pressure and with at least one other evaporator associated with the freezer compartment that operates at a second refrigerant fluid pressure; and a plurality of refrigerant fluid conduits operably connecting the condenser, the linear compressor and the evaporators into a refrigerant fluid flow circuit and such that the evaporators are capable of running simultaneously at different pressure levels and refrigerant flows from the evaporators, to the pulse width modulation refrigerant flow switch and through the pulse width modulation refrigerant flow switch.

21 Claims, 4 Drawing Sheets

Related U.S. Application Data a continuation-in-part of application No. 13/279,386, filed on Oct. 24, 2011, now Pat. No. 8,720,222, and a continuation of application No. 13/780,967, filed on Feb. 28, 2013, now Pat. No. 9,605,884.

(51) Int. Cl.

| | | |
|---|---|---|
| *F16K 1/06* | (2006.01) | |
| *F25B 31/00* | (2006.01) | |
| *F25B 41/04* | (2006.01) | |
| *F25B 5/02* | (2006.01) | |
| *F16K 31/06* | (2006.01) | |
| *F25D 11/00* | (2006.01) | |
| *F25D 23/06* | (2006.01) | |

(52) U.S. Cl.
CPC ............ *F25B 5/02* (2013.01); *F25B 41/043* (2013.01); *F25B 2600/0252* (2013.01); *F25B 2600/2511* (2013.01); *F25B 2600/2521* (2013.01); *F25D 11/006* (2013.01); *F25D 23/065* (2013.01); *F25D 2500/02* (2013.01); *Y02B 40/32* (2013.01)

(58) Field of Classification Search
CPC .............. F25B 31/00; F25B 41/046; F25B 2600/2501; F25B 2600/0253; F25B 2400/073; F25B 2600/2511; F25B 2600/2521; F25B 2600/0252; F25B 2600/025; F16K 31/0603; F16K 11/0746; Y02B 40/32
USPC .............................. 62/228.4, 228.5
See application file for complete search history.

(56) References Cited

U.S. PATENT DOCUMENTS

| | | | |
|---|---|---|---|
| 3,727,423 A | 4/1973 | Nielson | |
| 4,383,421 A | 5/1983 | Quesnoit | |
| 4,416,119 A | 11/1983 | Wilson et al. | |
| 4,658,596 A | 4/1987 | Kuwahara | |
| 4,773,472 A | 9/1988 | Aoki et al. | |
| 4,779,425 A | 10/1988 | Sasaki et al. | |
| 5,231,847 A | 8/1993 | Cur et al. | |
| 5,251,455 A | 10/1993 | Cur et al. | |
| 5,285,652 A | 2/1994 | Day | |
| 5,465,591 A | 11/1995 | Cur et al. | |
| 5,473,901 A | 12/1995 | Roseen | |
| 5,522,216 A | 6/1996 | Park et al. | |
| 5,743,098 A | 4/1998 | Behr | |
| 6,006,527 A | 12/1999 | Hansen et al. | |
| 6,286,326 B1 | 9/2001 | Kopko | |
| 6,318,977 B1 | 11/2001 | Kopko | |
| 6,519,958 B1 | 2/2003 | Moon et al. | |
| 6,612,121 B2 | 9/2003 | Moon et al. | |
| 6,637,222 B2 | 10/2003 | Moon et al. | |
| 6,672,090 B1 | 1/2004 | Healy et al. | |
| 6,729,150 B2 | 5/2004 | Shin et al. | |
| 6,868,685 B2 | 3/2005 | Kim | |
| 6,931,867 B2 | 8/2005 | Healy et al. | |
| 7,181,954 B2 | 2/2007 | Horie | |
| 7,389,649 B2 | 6/2008 | Pham et al. | |
| 7,419,365 B2 | 9/2008 | Pham et al. | |
| 7,472,556 B2 | 1/2009 | Kirby et al. | |
| 7,654,098 B2 | 2/2010 | Pham et al. | |
| 7,762,102 B2 | 7/2010 | Hamel et al. | |
| 8,720,222 B2 | 5/2014 | Cur et al. | |
| 2002/0043073 A1 | 4/2002 | Park et al. | |
| 2003/0033823 A1* | 2/2003 | Pham | F04C 23/008 62/228.3 |
| 2003/0084673 A1* | 5/2003 | Moon | F24F 11/0079 62/184 |
| 2003/0167789 A1 | 9/2003 | Tanimoto | |
| 2003/0230097 A1* | 12/2003 | Moon | F25B 49/022 62/175 |
| 2004/0079097 A1* | 4/2004 | Kim | F24F 11/008 62/228.5 |
| 2005/0223721 A1 | 10/2005 | Kirby et al. | |
| 2006/0201175 A1 | 9/2006 | Shapiro et al. | |
| 2008/0072611 A1 | 3/2008 | Ahmed et al. | |
| 2008/0134699 A1 | 6/2008 | Leaver et al. | |
| 2009/0277196 A1 | 11/2009 | Gambiana et al. | |
| 2009/0277197 A1 | 11/2009 | Gambiana et al. | |
| 2009/0293514 A1 | 12/2009 | Junge | |
| 2010/0011893 A1 | 1/2010 | Kawamoto | |
| 2010/0082162 A1* | 4/2010 | Mundy | F24F 3/044 700/277 |
| 2011/0185760 A1 | 8/2011 | Suh et al. | |
| 2011/0192176 A1* | 8/2011 | Kim | F24F 3/065 62/115 |
| 2012/0023975 A1* | 2/2012 | Yoon | F25D 11/022 62/81 |
| 2012/0210597 A1 | 8/2012 | Bison et al. | |
| 2013/0243607 A1* | 9/2013 | Dainez | F04B 49/00 417/1 |
| 2014/0023524 A1 | 1/2014 | Maass et al. | |

OTHER PUBLICATIONS

"Analysis of Refrigerator/Freezer Appliances Having Dual Refrigeration Cycles", Authors: Gan, Andre I, et al, Jan. 1, 2000.

Effects of Operating Variables on Heat Transfer and Energy Consumption of a Household Refrigerator-Freezer During Closed Door Operation, Hasanuzzaman, M et al 2008.

\* cited by examiner

MULTIPLE EVAPORATOR CONTROL USING PWM VALVE/COMPRESSOR

CROSS-REFERENCE TO RELATED APPLICATIONS

This application is a continuation-in-part of U.S. application Ser. No. 13/279,421, entitled HIGHER EFFICIENCY APPLIANCE EMPLOYING THERMAL LOAD SHIFTING IN REFRIGERATORS HAVING VERTICAL MULLION, filed on Oct. 24, 2011, now U.S. Pat. No. 9,103,569, issued Aug. 11, 2015, the entire disclosure of which is incorporated herein by reference. This application is also a continuation-in-part of U.S. application Ser. No. 13/279,386, entitled HIGHER EFFICIENCY APPLIANCE EMPLOYING THERMAL LOAD SHIFTING IN REFRIGERATORS HAVING HORIZONTAL MULLION, filed on Oct. 24, 2011, now U.S. Pat. No. 8,720,222, issued May 13, 2014, the entire disclosure of which is incorporated herein by reference. This application is also a continuation of and claims priority to U.S. patent application Ser. No. 13/780,967, entitled "MULTIPLE EVAPORATOR CONTROL USING PWM VALVE/COMPRESSOR" filed Feb. 28, 2013, which is incorporated herein by reference in its entirety.

SUMMARY OF THE INVENTION

The present invention generally relates to a refrigerator including a freezer compartment and fresh food refrigeration compartment and particularly a cooling system for maximizing the efficiency of operation of the refrigerator; however, the systems described herein are also applicable to other refrigeration systems with two or more zones (evaporators) at different temperatures. For example, the system could be used in a multiple compartment system where two compartments or more are above freezing or two or more are below. The system may also be conceivably used in connection with air conditioning systems, in particular residential air conditioning systems.

One aspect of the present invention is a refrigeration system that includes: a compressor having an outlet and an inlet; a condenser operably coupled to the compressor outlet and configured to receive refrigerant fluid from the compressor; a plurality of evaporators each operating and coupled in parallel to the condenser and each having an inlet pressure side and an outlet pressure side and each receiving refrigerant fluid from the condenser via the inlet pressure side and each outputting refrigerant fluid at different evaporator outlet pressures; refrigerant fluid conduits operably coupling the compressor, the condenser and the plurality of evaporators thereby forming a refrigerant fluid circuit for the transmission of the refrigerant fluid between the compressor, the condenser, and the plurality of evaporators; and a switch valve operably coupled to the outlet pressure side of each of the plurality of evaporators using the refrigerant fluid conduits, wherein the switch valve is configured to switch between any one evaporator of the plurality of evaporators such that the switch valve provides an inlet pressure of refrigerant fluid to the compressor at a pressure between a highest evaporator outlet pressure and a lowest evaporator outlet pressure of the different outlet pressures of the plurality of evaporators.

Another aspect of the present invention is generally directed to an appliance that includes a cabinet comprising fresh food compartment having an interior and a freezer compartment having an interior; at least one door operably connected to the cabinet to allow a user to access the interior of the fresh food compartment, the interior of the freezer compartment or both the interior of the fresh food compartment and the interior of the freezer compartment; and a refrigeration system spaced within the cabinet for cooling the fresh food compartment and the freezer compartment having a condenser; a linear compressor that is activated and deactivated by a pulse width modulation switching device; a pulse width modulation refrigerant flow switch; at least two evaporators operably connected in parallel with one another with at least one evaporator associated with the refrigerator compartment that operates at a first refrigerant fluid pressure and with at least one other evaporator associated with the freezer compartment that operates at a second refrigerant fluid pressure; and a plurality of refrigerant fluid conduits operably connecting the condenser, the linear compressor and the evaporators into a refrigerant fluid flow circuit and such that the evaporators are capable of running simultaneously at different pressure levels and refrigerant flows from the evaporators, to the pulse width modulation refrigerant flow switch and through the pulse width modulation refrigerant flow switch such that the output fluid pressure from the pulse width modulation refrigerant flow switch that is delivered to a compressor chamber is between the first refrigerant fluid pressure and the second refrigerant fluid pressure.

Another aspect of the present invention is generally directed toward a method of operating a refrigeration system employing the following steps: activating a single linear compressor using a pulse width modulation switch such that the single linear compressor compresses refrigerant fluid and supplies compressed refrigerant fluid to a single condenser via fluid conduits from the compressor outlet; supplying compressed refrigerant fluid to a plurality of evaporators via fluid conduits such that each evaporator is fluidly connected to the condenser and wherein each of the evaporators are connected in parallel and configured to operate simultaneously at different refrigerant fluid pressures with one evaporator having a highest evaporator operating pressure and one other evaporator having a lowest evaporator operating pressure using refrigerant from the single linear compressor and wherein a first evaporator is associated with a first appliance food compartment and a second evaporator is associated with a second appliance food compartment; and recirculating refrigerant fluid back to the single linear compressor using a pulse width modulation refrigerant control valve that receives refrigerant fluid from the plurality of evaporators and supplies a return refrigerant fluid pressure level refrigerant fluid to the compressor via a compressor inlet that is at a pressure between the highest evaporator operating pressure and the lowest evaporator operating pressure.

Yet another aspect of the present invention is generally directed toward a refrigeration system that includes: a compressor having an outlet and an inlet; a condenser operably coupled to the compressor outlet and capable of receiving refrigerant fluid from the compressor; a plurality of evaporators each operably coupled in parallel to the condenser and each having an inlet pressure side and an outlet pressure side and each receiving refrigerant fluid from the condenser via the inlet pressure side; refrigerant fluid conduits operably coupling the compressor, the condenser and the plurality of evaporators thereby forming a refrigerant fluid circuit for the transmission of the refrigerant fluid between the compressor, the condenser, and the plurality of evaporators; a plurality of valves, wherein at least one valve is associated with the inlet pressure side of each of the plurality of evaporators and each valve being movable between an open position and a closed position in response to a demand signal, and wherein each valve can be simultaneously or individually opened to supply one or more of the plurality of evaporators with refrigerant fluid such that refrigerant fluid is capable of being supplied to one evaporator at a given time or multiple evaporators of the plurality of evaporators at a given time; and a switch valve operably coupled to the outlet pressure side of each of the plurality of evaporators using the refrigerant fluid conduits. The switch valve is capable of switching between any one evaporator of the plurality of evaporators such that the switch valve provides an averaged inlet pressure of refrigerant fluid to the compressor.

Yet another aspect of the present invention is generally directed toward an appliance that includes a cabinet having a fresh food compartment inlet having an interior and a freezer compartment having an interior; at least one door operably connected to the cabinet to allow a user to access the interior of the fresh food compartment, the interior of the freezer compartment or both the interior of the fresh food compartment and the interior of the freezer compartment; and a refrigeration system spaced within the cabinet for cooling the fresh food compartment and the freezer compartment. The appliance typically includes a condenser; a linear compressor that is activated and deactivated by a pulse width modulation switching device; a pulse width modulation refrigerant flow switch; at least two evaporators operably connected in parallel with one another with at least one evaporator associated with the refrigerator compartment that operates at a first refrigerant fluid pressure and with at least one other evaporator associated with the freezer compartment that operates at a second refrigerant fluid pressure; and a plurality of refrigerant fluid conduits operably connecting the condenser, the linear compressor and the evaporators into a refrigerant fluid flow circuit and such that the evaporators are capable of running simultaneously at different pressure levels and refrigerant flows from the evaporators, to the pulse width modulation refrigerant flow switch and through the pulse width modulation refrigerant flow switch such that the output fluid pressure from the pulse width modulation refrigerant flow switch is the average refrigerant fluid pressure of the refrigerant received from each of the evaporators at the point in time the switch is in the open position allowing refrigerant flow therethrough.

Yet another aspect of the present invention is generally directed toward a method of operating a refrigeration system comprising the steps of: activating a single linear compressor using a pulse width modulation switch such that the single linear compressor compresses refrigerant fluid and supplies compressed refrigerant fluid to a single condenser via fluid conduits from the compressor outlet; supplying compressed refrigerant fluid to a plurality of evaporators via fluid conduits such that each evaporator is fluidly connected to the condenser and recirculating refrigerant fluid back to the single linear compressor using a pulse width modulation refrigerant control valve that receives refrigerant fluid from the plurality of evaporators and supplies an averaged refrigerant fluid pressure level of refrigerant fluid to the compressor via a compressor inlet wherein the averaged refrigerant fluid pressure level is the average pressure level of the different fluid pressures at a given time. Each of the evaporators are connected in parallel and capable of operating simultaneously at different refrigerant fluid pressures and a first evaporator is associated with a first appliance food compartment and a second evaporator is associated with a second appliance food compartment.

The refrigeration system of the present invention allows for multiple evaporators in a multiple evaporator system where the multiple evaporators are configured in parallel with one another to work simultaneously or independently with a (single) compressor, typically a (single) variable capacity compressor, more typically a (single) linear compressor operating at a higher capacity during low load conditions. Under high demand situations, multiple evaporators can be used to cool different compartments of a refrigerator and outlet pressures from the evaporators are sent to a pulse-width-modulation switch valve which is controlled by a pulse-width-modulation signal to send an averaged pressure of refrigerant from the evaporators to the linear compressor, which allows for a very fast start and stop process, thereby allowing all the evaporators in the system to operate simultaneously. The linear compressor can also run at a higher frequency and use the pulse-width-modulation switch to turn the compressor on and off frequently. In this way, the best compressor efficiency is achieved and all the evaporators can operate at about the same time, reducing the system losses as well as the need for a complex control.

In an aspect of the present invention, a refrigeration system includes a compressor having an outlet and an inlet which is operably coupled to a condenser at the compressor outlet wherein the condenser is capable of receiving refrigerant fluid from the compressor. The refrigeration system also includes a plurality of evaporators which are operably coupled to the condenser wherein the evaporators have an inlet pressure side and an outlet pressure side and receive refrigerant fluid from the condenser on the inlet pressure side. Conduits operably couple the compressor/condenser and the plurality of evaporators for the transmission of the refrigerant fluid. The refrigeration system also includes a plurality of valves wherein at least one valve is associated with the inlet pressure side of each of the plurality of evaporators. The valves can be opened or closed in response to a demand signal, and the system is set up so that each valve can be simultaneously opened to supply the plurality of evaporators simultaneously with refrigerant fluid. A switch valve is operably coupled to the outlet pressure side of each of the plurality of evaporators, and the switch valve is capable of rapidly switching between any one of the plurality of evaporators for providing an averaged inlet pressure of refrigerant to the compressor to which it is coupled.

In another aspect of the present invention, a refrigeration system for use with an appliance having at least two compartments, wherein one compartment is a fresh food compartment and another compartment is a frozen food compartment. The refrigeration system includes a condenser and a linear compressor. The condenser and the compressor are operably engaged with one another using at least one condenser/compressor linking fluid conduit. A first evaporator associated with the fresh food compartment operates at a first fluid pressure level that is operably engaged with the condenser using a first evaporator/condenser linking fluid conduit. The first evaporator is also coupled to the compressor using a first evaporator/compressor linking fluid conduit. A second evaporator associated with the frozen food compartment operates at a second fluid pressure level and is operably engaged with the condenser using a second evaporator/condenser linking fluid conduit. The second evaporator is also operably engaged with the compressor using a second evaporator/condenser linking fluid conduit wherein the second fluid pressure level is different than the first fluid pressure level. The refrigeration system further includes a switch valve disposed between the first evaporator, the second evaporator, and the compressor, wherein the switch valve receives fluid from both the first evaporator and the second evaporator and provides an average inlet pressure to the compressor using pulse-width-modulation of the first fluid and the second fluid pressure levels to the compressor when the first and second evaporators operate simultaneously.

In yet another aspect of the present invention, a method of operating a refrigeration unit comprises providing a compressor, typically a variable capacity, more typically a linear compressor, for a refrigerant, connecting a condenser to the compressor, coupling the plurality of evaporators to the condenser in parallel with one another, operating a plurality of evaporators simultaneously, and modulating pressure levels from the plurality of evaporators to the compressor with a pulse-width-modulation switch valve.

These and other features, objects and advantages of the present invention will become apparent to those skilled in the art upon reading the following description thereof together with reference to the accompanying drawings.

DETAILED DESCRIPTION OF THE PREFERRED EMBODIMENT

Figure 1:
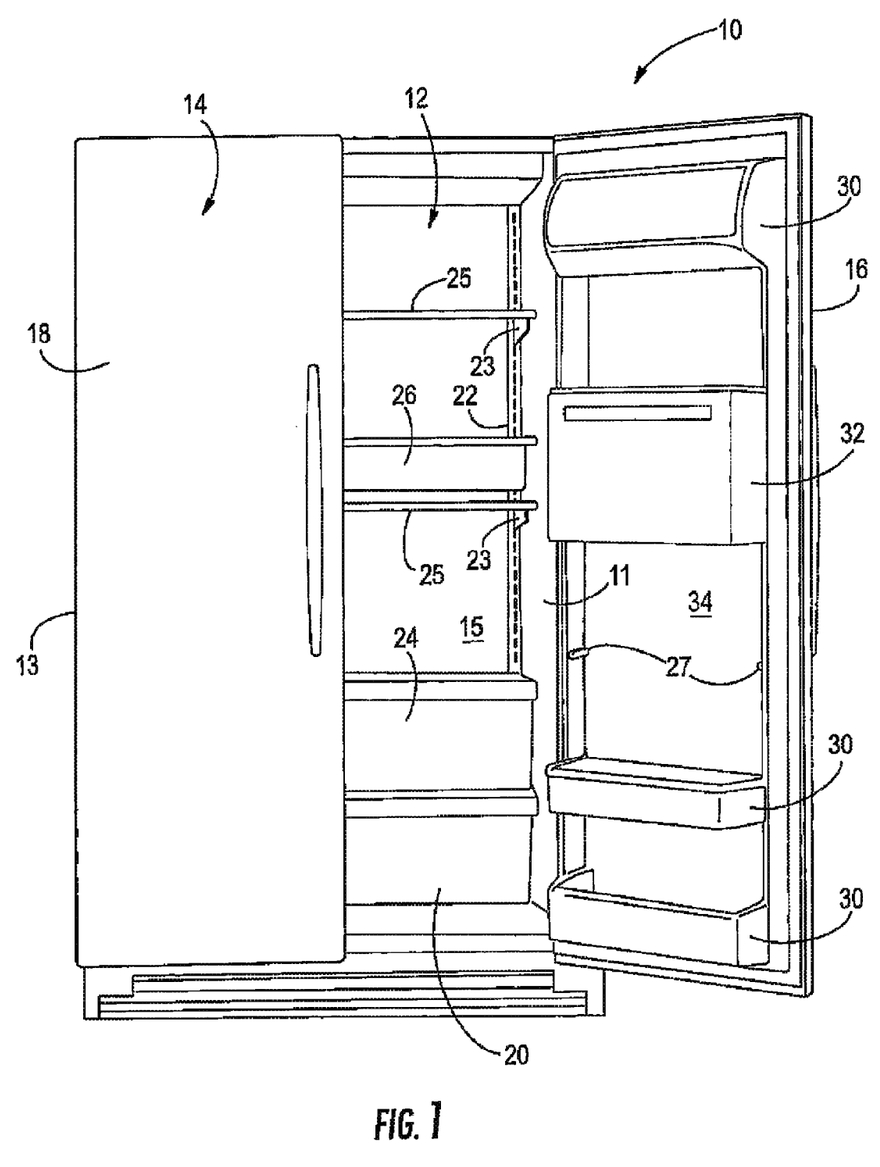
FIG. 1 is a perspective view of a side-by-side refrigerator freezer incorporating the multiple evaporator system.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring initially to FIG. 1, there is shown a refrigerator 10 according to an aspect of the present invention. This aspect includes a side-by-side refrigerated cabinet section 12 and a freezer cabinet section 14 (behind the door 18). The refrigerator 10 includes side walls 11 and 13, respectively, and a rear wall 15. The refrigerator also typically includes at least one mullion that partially defines the refrigerated cabinet section(s) and the freezer cabinet(s) section(s). When more than two cabinet sections are formed, typically additional mullion wall sections are utilized. Refrigerator 10 also includes at least one closure door 16 for the refrigerator cabinet section 12, which is hinged to refrigerator cabinet section 12 and at least one freezer door 18 hinged to the freezer cabinet section 14. Both doors 16 and 18 include suitable seals for providing an airtight, or at least substantially airtight, thermally insulated sealed connection between the doors and respective cabinets. Although a side-by-side refrigerator/freezer 10 is illustrated in FIG. 1, other configurations, such as bottom mount freezer (including French door bottom mount freezers), top mount freezer configurations, may also be employed. Any systems with a third pull-out compartment or for that matter any number of separately coated compartments each typically with their own associated evaporator may be used. The compartments may be separate compartments within narrow cabinet sections or separate cabinet sections accessible by opening an access door 16, 18, for example, to access the interior volume of the cabinet. The present invention can be employed with any configuration of a refrigerator/freezer combination or any other multiple zone refrigeration device.

Refrigerator 10 is adapted to receive and/or be capable of receiving a variety of shelves and modules at different positions defined by, in the embodiment shown in FIG. 1, a plurality of horizontally spaced vertical rails 22 extending from the rear wall 15 of the refrigerator and freezer cabinet sections 12, 14. In the embodiment shown, the supports are in the form of vertically extending rails 22 with vertically spaced slots for receiving mounting tabs on shelf supports 23 and similar tabs on modules, such as modules 20 (crisper), 24 (crisper), 25 (shelf unit), and 26 (drawer), for attaching the modules in cantilevered fashion to the cabinet sections 12, 14 at selected incrementally located positions. The inside edges of doors 16 and 18 also include vertically spaced shelf supports, such as 27, for positioning and engaging bins 30 and modules, such as 32, in the doors, in particular within the pocket of the door defined by the liner 34. The shelves, modules, bins, and the like, can be located at a variety of selected locations within the cabinet sections 12 and 14 and doors 16 and 18 to allow the consumer to select different locations for convenience of use.

Some of the modules in refrigerator 10, such as modules 20 and 32, may be powered modules or components and therefore require operating utilities. Thus, for example, module 20 may be a powered crisper or an instant thaw or chill module and may require utilities, such as cooled or heated fluids or electrical operating power and receive these utilities from the appliance. Other modules, such as module 26, may likewise require operational utilities while modules, such as a passive crisper module, would not. Door modules also, such as module 32, may, for example, include a water dispenser, vacuum bag sealer or other accessory conveniently accessible either from the outside of door 16 or from within the door and likewise may receive operating utilities from conduits, such as disclosed in application Ser. No. 12/469,915 filed May 21, 2009, entitled REFRIGERATOR MODULE MOUNTING SYSTEM; and Ser. No. 12/469,968 filed May 21, 2009, entitled MULTIPLE UTILITY RIBBON CABLE. The disclosures of these patent applications are incorporated herein by reference in their entirety. While not shown in the Figures, the modules may also be used for quick cooling of beverages, quick freezing/chilling of other food stuffs or even making of ice, ice pieces (cubes), or frozen products.

Contained within the insulated cabinets of the refrigerator are the usual freezer and fresh food evaporator, condenser, and the usual fluid couplings to a compressor for the operation of the refrigerator. Refrigerator 10 of this invention, however, includes additional fluid circuits for supplying at least a dual evaporator system. The refrigeration system according to an aspect of the present invention incorporates a multiple evaporator system having a pulse-width-modulation (PWM) switch valve as shown generally in the schematic diagram of FIG. 2, now described.

Figure 2:
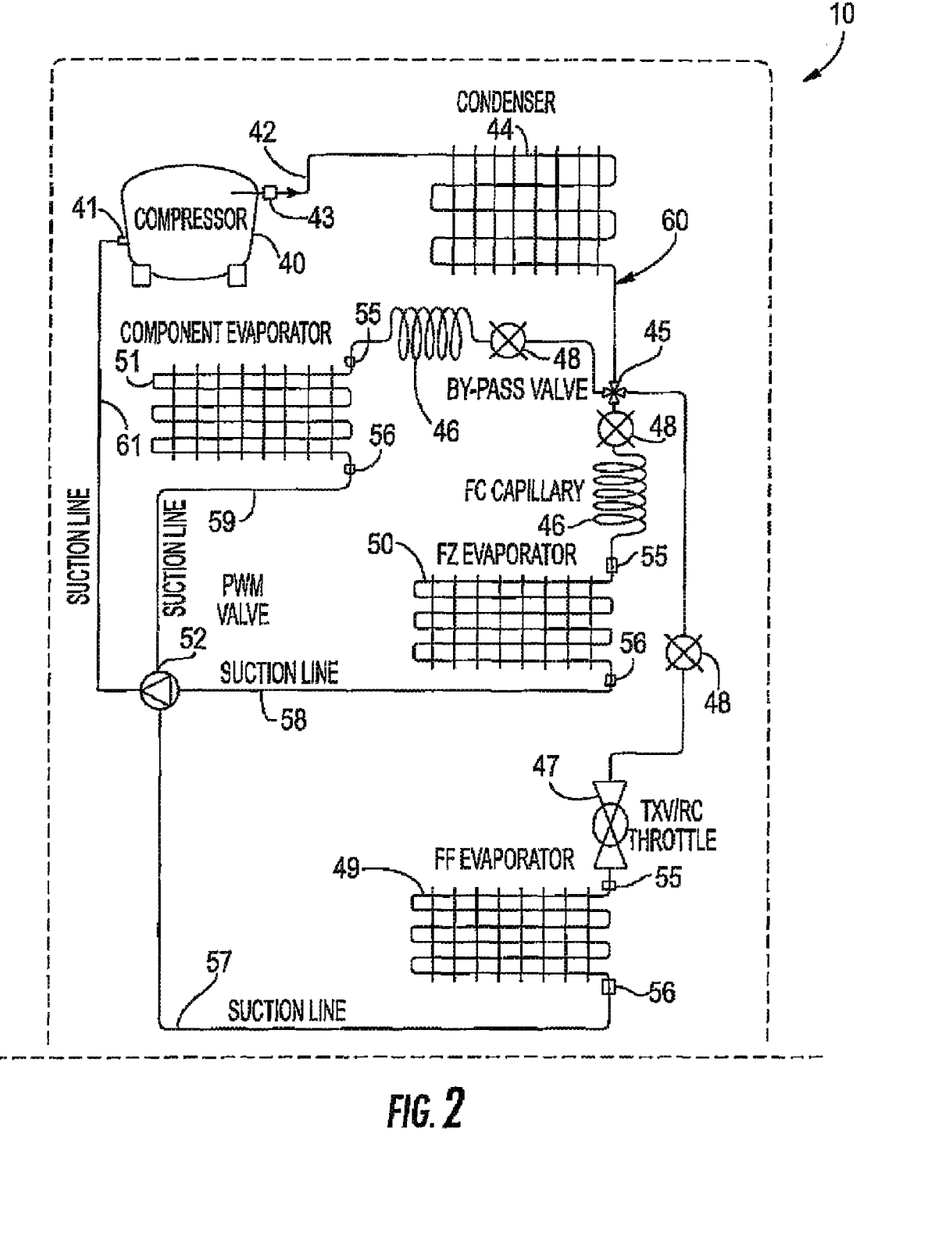
FIG. 2 is a schematic view of the components of the multiple evaporator system of the present invention.

The schematic diagram of FIG. 2 shows the locations of various major components of the refrigerator and thermal storage system in no particular relationship within the refrigerator cabinet, it being understood that, in practice, these elements can be located in any conventional or convenient location. For example, the condenser may conventionally be located in the back outside wall of the cabinet or in a compartment above cabinet sections 12, 14. Thus, the schematic diagram of FIG. 2 is illustrative only and does not limit the position of any of the components.

In FIG. 2, refrigerator 10 of an aspect of the present invention incorporates a linear compressor 40. The linear compressor is a variable capacity compressor. The linear compressor is also typically an oil-less compressor. Due primarily to its relatively flat elongated shape, and the oil-less nature of the linear compressor, it can be located conveniently at nearly any location within the refrigerator in any orientation within the cabinet, including in the space between the refrigerator inner liner and its outer shell. The compressor is typically located near the top of the refrigerator near the condenser where heat can be evacuated upwardly and away from the refrigerator cabinet. One type of compressor, the compressor 40 can be of the type described in U.S. patent application Ser. No. 10/553,944 filed Apr. 22, 2004, entitled SYSTEM FOR ADJUSTING RESONANT FREQUENCIES IN A LINEAR COMPRESSOR and published as United States Patent Application Publication No. 2006/0110259 on May 25, 2006. The disclosure of this application and publication are incorporated herein by reference in their entirety. While not preferred, any other type of compressor may also be employed in connection with the present invention including a standard reciprocations compressor. A linear compressor is presently used to allow the system to even more dynamically adjust to changing thermal loads because the stroke length of the compressor can be quickly regulated to match cooling needs and increase cooling capacity of the overall system. Such dynamic adjustments are not possible with a standard compressor versus a variable capacity compressor, in particular a linear compressor.

Refrigerators typically cycle on and off depending upon the frequency of use, the refrigerator content, and the surrounding environmental conditions. With conventional refrigerators, the refrigerator compressor runs at maximum capacity regardless of load demands. This results in the utilization of a significant amount of excess energy, which is environmentally wasteful and expensive for the consumer. Linear compressors, such as disclosed in U.S. Patent Application Publication No. 2006/00110259, are capable of a variable operating capacity. Linear compressors, thus, can be controlled to meet the actual demand for refrigerators, but also have the benefit of operating at a higher capacity than conventional rotary compressors. Additionally, the capacity to compression work ratio of linear compressors according to an aspect of the present invention, can be amplified beyond that of a reciprocating compressor, thus providing a further favorable energy efficient operational condition.

For systems having multiple evaporators (2 or more), a priority sequence is generally used in a controller apparatus to control the priority of the evaporators' run times, such that the compressor receives a consistent inlet pressure from the evaporator system wherein a running evaporator can have a different evaporation pressure than the other evaporators in the system. Current compressors are not able to operate with different inlet pressures from multiple evaporators at the same time. Currently, in a multiple evaporator system, when one evaporator is working, the second, third, or fourth evaporator needs to stop so as not to send differing inlet pressures to the compressor. In such a system, it is necessary to implement a complex control strategy to determine evaporator priority along with complex valve systems in place to avoid compressor problems and system loss.

As shown in FIG. 2, a compressor 40 is operably coupled to and part of an overall refrigeration circuit 60 including coolant fluid conduit 42 which couples the compressor 40 to a condenser 44. In the exemplary system shown in FIG. 2, a plurality of evaporators 49, 50, 51, are used to cool the fresh food compartment, the freezer compartment, and a component compartment (such as modules 20 and 32 as shown in FIG. 1), respectively. While three evaporators are shown in FIG. 2, two or more may be employed in any given design. In order to cool the various compartments of the refrigerator 10, the condenser 44 directs refrigerant flow through the refrigeration circuit 60 toward the plurality of evaporators. In the embodiment shown in FIG. 2, a system of valves is comprised of a plurality of bypass valves 48 which are movable between an opened position and a closed position. The valves 48 are either opened to allow refrigerant to flow to the associated evaporator, or closed to bypass the flow of refrigerant to the associated evaporator. The valve system controls the bypass valves 48 based on a demand signal, such that the valves 48 are selectively operated by a microprocessor-based control circuit to either allow the flow of refrigerant to the associated evaporator, or bypass the flow of refrigerant to the associated evaporator. The valve system operation is based on the thermal demand of the cabinets sections 12, 14 and an associated component.

As shown in FIG. 2, any metering device such as a thermostatic expansion valve 47 shown in the refrigeration circuit 60 preceding the fresh food evaporator 49 may be employed. The optional thermostatic expansion valve 47 or other metering device may be positioned in the refrigeration circuit prior to refrigerant entering any one, any combination, or all of the plurality of evaporators 49, 50, 51. Instead of a thermoelectric expansion valve, a compartment capillary device 46 can be used prior to any evaporator of the system, as shown in FIG. 2, preceding the freezer compartment evaporator 50 and the compartment evaporator 57.

The compressor 40 further comprises at least one inlet 41, but could have a plurality of two or more inlets 41 and an outlet 43. The evaporators 49, 50, 51 have an inlet pressure side 55 and an outlet pressure side 56. An optional four-way valve 45 is shown linking the coolant fluid conduit from the condenser and the coolant fluid conduit that supplies coolant to the evaporators. If only two evaporators were employed, a three-way valve may be used. A series of valves could also be used so long as coolant fluid is delivered to each evaporator. Optionally, these valves could be configured to be controlled to regulate coolant fluid flow. The optional bypass valves 48 send refrigerant through conduits of the refrigeration circuit 60 to the inlet pressure side 55 of the associated evaporator when the valves 48 are in the open position. After an evaporator finishes cooling a zone of the refrigerator 10, the remaining refrigerant exits the evaporator via the outlet pressure side 56. The refrigerant then moves through suction refrigerant fluid conduit lines 57, 58, 59 depending on the evaporator(s) in use. The system shown in FIG. 2 is capable of running all three evaporators simultaneously, such that all valves 48 can be in the open position to supply refrigerant to the evaporators 49, 50, 51 and remaining refrigerant will then flow through suction lines 57, 58, 59 at the same or at variable pressures. Similarly, any two evaporators can be in operation simultaneously or one evaporator can be in operation at a given time. The suction lines 57, 58 and 59 send refrigerant from the outlet pressure sides 56 of the associated evaporators to a pulse-width-modulation (PWM) switch valve 52 which then sends a pressure of refrigerant between the outlet pressure side having the highest pressure and the outlet pressure side with the lowest pressure (when only two suction lines are fed into the PWM valve (see FIG. 3) the valve sends an approximately average pressure or the average pressure of the two suction lines) to the compressor inlet 41 via suction line 61. In this way, a single compressor, preferably a variable capacity compressor, and more preferably a linear compressor and typically a single condenser can efficiently and effectively run a multiple (two or more) evaporator system even when the pressure exiting any one evaporator is varied as compared to another evaporator in the system as described below.

Figure 3:
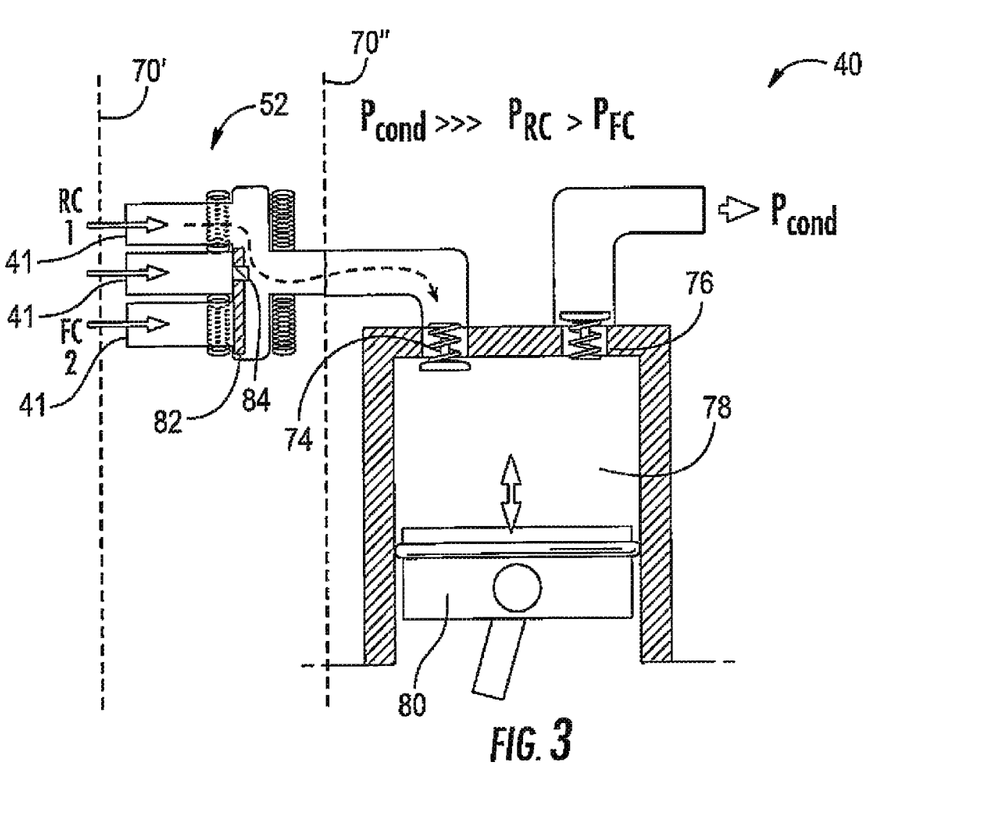
FIG. 3 is a schematic view of a pulse width modulation valve having two intake valves with a single outlet switching to different stages/settings to allow fluid to flow through one intake at a time.
Figures 4A, 4B, 4C:
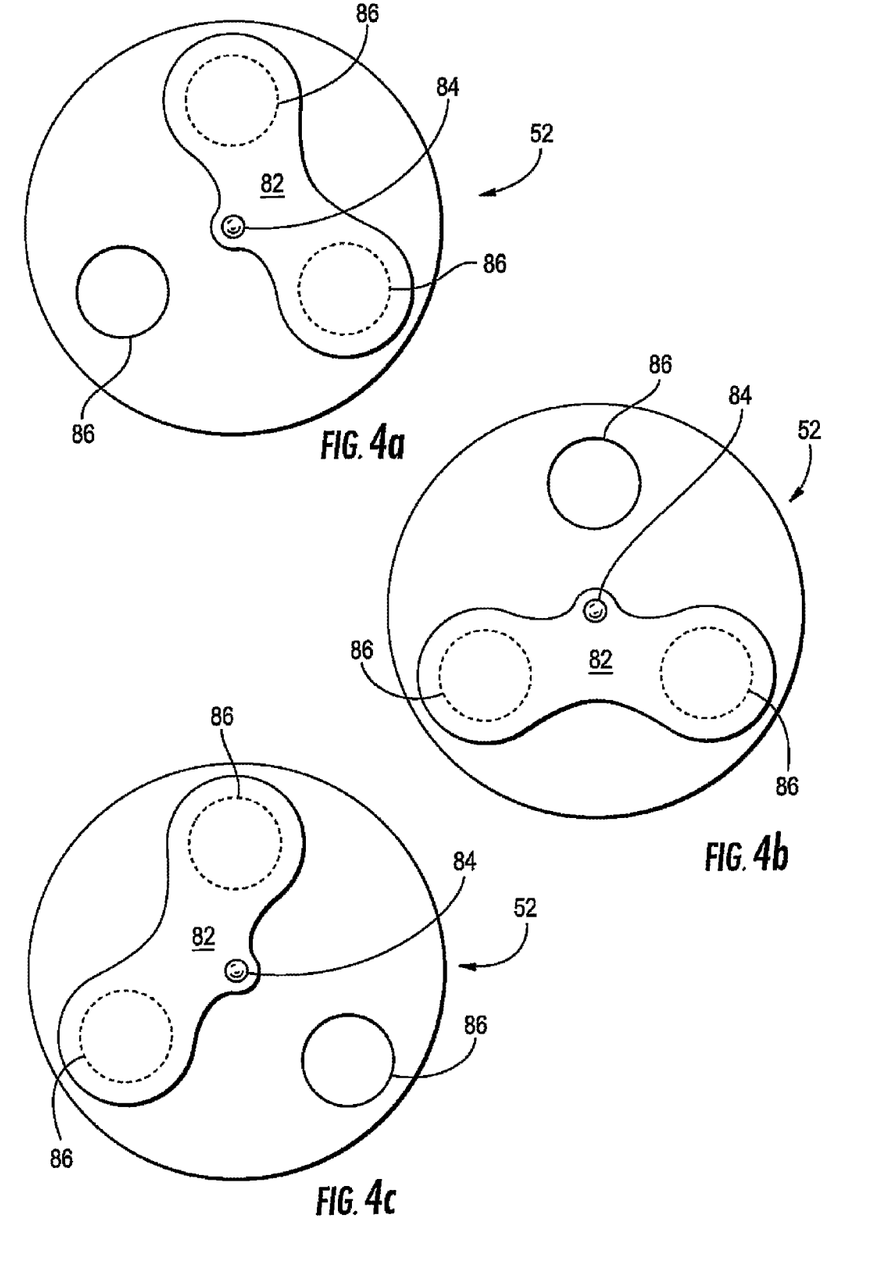
FIGS. 4a-4c are staged in-line views of a three-way intake valve with a single outlet used in connection with a single suction compressor line showing a switching system.

Pulse-width-modulation is a technique used for controlling power to electrical devices, such as the PWM switch valve 52 (best shown in FIGS. 3 and 4a-4c). As shown in FIG. 3, the switch valve can be turned on and off at a fast pace, typically about 30 seconds or less or exactly 30 seconds or less, more typically about 0.5 seconds or less or exactly 0.5 seconds or less, and most typically about 10 milliseconds or less or exactly 10 milliseconds or less (or any time interval from about 30 seconds or less), via a pulse-width-modulation signal sent from a controller using a control signal such as a direct current signal, digital signal or serial control. The rapid switching time interval can be dynamically adjusted based upon a given cooling demand for a portion of the appliance serviced by any individual appliance compartment or device. The rapid switching also allows the system to dynamically adjust to changing thermal load conditions of a given section of the appliance, typically based upon use of the appliance, most typically thermal load changes brought about by a user accessing one of the cabinet sections by opening one or more of the doors. The rapid switching allows for the system to pull refrigerant from all circuits, but allows for more of the refrigerant flow to travel through the evaporator serving the cabinet section or compartment associated with the highest thermal load and needing the added cooling capacity at the time. The rapid switching between the refrigerant flow lines at the rates described above cause the refrigerant flow lines to operate sequentially and allows the system to emulate and behave as a system that has the evaporators configured in parallel with one another.

As shown in FIG. 3, the PWM valve 52 may be within the compressor housing (dashed line 70' or outside the compressor housing 70"). An electrical solenoid PWM valve (two intake in FIG. 3 and rotating three intake version in FIGS. 4a-c) regulates the suction lines coolant is permitted to flow through, one suction line at a time. In the valve shown in FIG. 3, blocking member 72 is moved by the electromagnetic action between the suction line intakes, in FIG. 3, between the refrigerant compartment section suction line (shown open) and the freezer compartment section suction line (shown closed). The PWM valve 52 shown in FIGS. 4a-c operates by rotating a generally butterfly-shaped blocking member 82 rotates about a central axis 84 to allow refrigerant fluid flow from any one of three intakes 86 in the embodiment of FIG. 4. While an electrical solenoid valve is typically used, other valves that enable rapid switching such as pneumatic valves, hydraulic valves, or mechanical valves may also be used. The spring-biased valves 74 and 76 of the compressor allow for coolant flow into and out of the piston chamber 78. The compressor piston 80 compresses the coolant fluid in the chamber 78. When the piston is drawn back fluid flows through valve 74 and when the piston 80 moves toward the valves 74 and 76, valve 76 opens and delivers refrigerant fluid out of the compressor.

A pulse-width-modulation signal can also be sent to the compressor in response to refrigerant demand in the refrigerator system. The pulse-width-modulation signal to the compressor allows for a fast paced load on and load off signal to be sent to the compressor resulting in a duty cycle somewhere between 100% and 0% allowing for better matching of load with evaporator/compartment cooling needs. A linear compressor, as used in the present invention, is particularly well adapted to a fast paced load on and load off signal due to the linear nature of the piston stroke of the linear compressor. In this way, the linear compressor of the present invention can run at a higher frequency and work closer to a maximum coefficient of performance using the pulse-width-modulation to turn the compressor on and off frequently and quickly. The pulse-width-modulation signal sent to the PWM switch valve 52 is designed to switch frequently and efficiently to send a coolant fluid pressure level between the highest suction pressure line and the lowest suction pressure lines' pressure levels to the compressor after having received varied pressures from the multiple evaporators in the system. Operating in this manner increases the system's coefficient of performance (COP) and achieves maximum compressor efficiency for supplying cooling to the refrigerator during times of high demand, lower demand, or during times of instantaneous demand for cooling in multiple zones. The controller uses pulse-width-modulation to modulate the compressor between a high capacity duty cycle (100%) and a low capacity duty cycle (0%). When greater cooling capacity is needed the system can operate at a higher capacity to match the need and do so dynamically through the use of a variable capacity (linear compressor) and the PWM switch valve 52.

The design of the present invention allows the compressor to operate more efficiently and keep all evaporators working at the same time, i.e. in parallel, thereby reducing system losses and avoiding the need for a complex control. The PWM switch valve is designed to switch very quickly between the evaporators (typically dynamically switching each about 0.01 seconds to about 30 seconds depending on cooling demand), thereby allowing the compressor inlet pressure to be an evaporator pressure average (when two evaporators are employed and between the highest pressure of the highest operating pressure evaporator and the lowest operating pressure of the lowest operating pressure evaporator, but typically approximately the average, when more than two evaporators are employed in the system. The pressure will be variable between the pressure of the highest operating pressure evaporator and the lowest operating pressure evaporator in the system. The pressure will vary based upon the percentage of time fluid flow is allowed through each evaporator by the PWM valve which increases the system's coefficient of performance.

It will become apparent to those skilled in the art that various modifications to the preferred embodiments of the invention as described herein can be made without departing from the spirit or scope of the invention as defined by the appended claims.

The invention claimed is:

1. An air conditioning system comprising:
a compressor having an outlet and an inlet;
a condenser operably coupled to the compressor outlet and configured to receive refrigerant fluid from the compressor;
a plurality of evaporators each operating and coupled in parallel to the condenser and each having an inlet pressure side and an outlet pressure side and each receiving refrigerant fluid from the condenser via the inlet pressure side and each outputting refrigerant fluid at different evaporator outlet pressures;

refrigerant fluid conduits operably coupling the compressor, the condenser and the plurality of evaporators thereby forming a refrigerant fluid circuit for transmission of the refrigerant fluid between the compressor, the condenser, and the plurality of evaporators; and a switch valve operably coupled to the outlet pressure side of each of the plurality of evaporators using the refrigerant fluid conduits, wherein the switch valve is configured to switch between any one evaporator of the plurality of evaporators such that the switch valve provides an inlet pressure of refrigerant fluid to the compressor at a pressure between a highest evaporator outlet pressure and a lowest evaporator outlet pressure of the different outlet pressures of the plurality of evaporators.

2. The air conditioning system of claim 1, wherein the compressor is the only compressor operably connected to the air conditioning system.

3. The air conditioning system of claim 1, wherein the condenser is the only condenser operably connected to the air conditioning system.

4. The air conditioning system of claim 3, wherein the compressor is the only compressor operably connected to the air conditioning system.

5. The air conditioning system of claim 1, wherein the switch valve is a pulse width modulation switch valve.

6. The air conditioning system of claim 5, wherein the compressor further comprises a pulse width modulation switch that activates and deactivates the compressor.

7. The air conditioning system of claim 6, wherein the compressor is a linear compressor and the switch valve is configured to switch between refrigerant flow lines at a rate of at least 30 seconds or faster such that the air conditioning system operates in a non-sequential manner.

8. The air conditioning system of claim 7, wherein the switch valve is configured to switch between refrigerant flow lines at a rate of at least about 10 milliseconds or faster and wherein the linear compressor is an oil-less compressor and wherein the system further comprises a plurality of valves, wherein at least one valve is associated with the inlet pressure side of each of the plurality of evaporators and each valve being moveable between an open position and closed position in response to a demand signal, and wherein each valve can be simultaneously or individually opened to supply one or more of the plurality of evaporators with refrigerant fluid such that refrigerant fluid is capable of being supplied to one evaporator at a given time or multiple evaporators of the plurality of evaporators at a given time.

9. The air conditioning system of claim 7, wherein the linear compressor is an orientation flexible compressor.

10. The air conditioning system of claim 2, wherein the compressor is a linear compressor and wherein the switch valve is configured to switch between the refrigerant fluid conduits at a rate of at least about 30 seconds or faster and cause the refrigerant fluid conduits to operate in a sequential manner.

11. The air conditioning system of claim 10, wherein the linear compressor is activated and deactivated by a pulse width modulation switching device.

12. The air conditioning system of claim 11, wherein the linear compressor is an orientation flexible and oil-less compressor.

13. The air conditioning system of claim 2, wherein the compressor is a linear compressor and wherein the switch valve is configured to switch between the refrigerant fluid conduits at a rate of at least about 30 seconds or faster and causes the refrigerant fluid conduits to operate in a sequential manner, thereby allowing the system to emulate a system with the evaporators in parallel.

14. The air conditioning system of claim 13, wherein the linear compressor is activated and deactivated by a pulse width modulation switching device.

15. The air conditioning system of claim 1, wherein the plurality of evaporators consists of a first evaporator and a second evaporator fluidly connected in parallel in the system and the compressor has a single inlet that receives refrigerant from the first evaporator and the second evaporator after refrigerant passes through a pulse width modulation switch valve operably and fluidly connected to both the first evaporator and the second evaporator.

16. The air conditioning system of claim 1, wherein the evaporators of the air conditioning system are spaced within an indoor evaporation and air delivery housing;

a first evaporator is associated with a sensible cooling load of a first space to be conditioned and operates at a first refrigerant fluid pressure level;

a second evaporator is associated with a latent cooling load of a second space to be conditioned and operates at a second refrigerant fluid pressure level;

the compressor is a linear compressor; and wherein the switch valve of the air conditioning system is a pulse width modulation switch valve.

17. An air conditioning system comprising:

an air conditioner cabinet;

an evaporation compartment spaced within the air conditioner cabinet for delivering conditioned air to an interior of an enclosure to be conditioned;

a condensing system spaced within the air conditioner cabinet for rejecting heat to an exterior of the enclosure to be conditioned, the condensing system comprised of:

a condenser;

a linear compressor that is activated and deactivated by a pulse width modulation switching device;

a pulse width modulation refrigerant flow switch valve having an outlet;

at least two evaporators operably connected in parallel with one another with at least one evaporator associated with a sensible cooling load compartment that operates at a first refrigerant fluid pressure and with at least one other evaporator associated with a latent cooling load compartment that operates at a second refrigerant fluid pressure; and a plurality of refrigerant fluid conduits operably connecting the condenser, the linear compressor, and the evaporators into a refrigerant fluid flow circuit such that the evaporators are capable of running simultaneously at different pressure levels and refrigerant flows from the evaporators, to the pulse width modulation refrigerant flow switch valve, and through the pulse width modulation refrigerant flow switch valve;

wherein the output fluid pressure from the pulse width modulation refrigerant flow switch valve is delivered to a compressor chamber between the first refrigerant fluid pressure and the second refrigerant fluid pressure.

18. The air conditioning system of claim 17, wherein refrigerant is received from the pulse width modulation refrigerant flow switch valve into the compressor through a single inlet of the compressor.

19. The air conditioning system of claim 17, wherein the compressor is an oil-less compressor and the air conditioning system further comprises at least one by-pass valve positioned within the refrigerant fluid flow circuit prior to fluid entering each evaporator to regulate flow of refrigerant into the evaporators.

20. The air conditioning system of claim 17, wherein the pulse width modulation refrigerant flow switch valve is configured to switch at a rate of once every about 30 seconds or faster.

21. A method of operating an air conditioning system comprising the steps of:
providing a single linear compressor having a compressor inlet and a compressor outlet;
providing a single condenser connected to the compressor outlet by a fluid conduit;
providing at least a first evaporator and a second evaporator connected in parallel via fluid conduits and configured to operate simultaneously at different refrigerant fluid pressures;
providing fluid conduits connecting the evaporators to the condenser;
providing a pulse width modulation switch connected to the linear compressor;
providing a pulse width modulation refrigerant flow control valve in fluid communication with the fluid conduits;
activating the single linear compressor using the pulse width modulation switch such that the single linear compressor compresses refrigerant fluid and supplies compressed refrigerant fluid to the single condenser via the fluid conduit connected to the compressor outlet;
supplying compressed refrigerant fluid to the evaporators via fluid conduits such that the first evaporator has a higher evaporator operating pressure and the second evaporator has a lower evaporator operating pressure using refrigerant from the single linear compressor and wherein the first evaporator is associated with a sensible cooling load and the second evaporator is associated with a latent cooling load; and
recirculating refrigerant fluid back to the single linear compressor using a pulse width modulation refrigerant flow control valve that receives refrigerant fluid from the evaporators and supplies a return refrigerant fluid pressure level of refrigerant fluid to the compressor via the compressor inlet that is at a pressure between the higher evaporator operating pressure and the lower evaporator operating pressure.

\* \* \* \* \*